United States Patent
Mehrer et al.

(10) Patent No.: US 7,622,821 B2
(45) Date of Patent: Nov. 24, 2009

(54) POWER DISTRIBUTION SYSTEM AND LOAD MANAGEMENT PROTOCOL THEREFOR

(75) Inventors: Michael E. Mehrer, San Diego, CA (US); John P. Spencer, Payson, AZ (US); Massoud Vaziri, Redmond, WA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 489 days.

(21) Appl. No.: 11/136,746

(22) Filed: May 25, 2005

(65) Prior Publication Data
US 2006/0267406 A1 Nov. 30, 2006

(51) Int. Cl.
*H02J 3/14* (2006.01)
*B64D 41/00* (2006.01)
*B64C 19/00* (2006.01)
(52) U.S. Cl. .................. 307/32; 244/58; 244/75.1
(58) Field of Classification Search ............ 244/58, 244/75.1; 307/32
See application file for complete search history.

(56) References Cited

U.S. PATENT DOCUMENTS

| | | | |
|---|---|---|---|
| 3,173,078 A * | 3/1965 | Farnsworth | 323/278 |
| 4,694,192 A * | 9/1987 | Payne et al. | 307/39 |
| 5,527,004 A * | 6/1996 | Haggerty et al. | 244/229 |
| 6,046,513 A * | 4/2000 | Jouper et al. | 307/31 |
| 6,267,327 B1 * | 7/2001 | Siefker | 244/53 R |
| 6,278,262 B1 | 8/2001 | Ullyott | |
| 6,437,963 B1 * | 8/2002 | Hamilton et al. | 361/227 |
| 6,450,447 B1 | 9/2002 | Kondrad et al. | |
| 6,704,625 B2 | 3/2004 | Albero et al. | |
| 6,777,822 B1 | 8/2004 | Suttie et al. | |
| 6,782,346 B2 | 8/2004 | Bond et al. | |
| 6,921,987 B2 * | 7/2005 | Marin-Martinod | 307/32 |
| 7,098,555 B2 * | 8/2006 | Glahn et al. | 307/32 |
| 7,364,116 B2 * | 4/2008 | Nguyen et al. | 244/58 |
| 7,373,222 B1 * | 5/2008 | Wright et al. | 700/295 |

* cited by examiner

*Primary Examiner*—Albert W Paladini
*Assistant Examiner*—Hal I Kaplan
(74) *Attorney, Agent, or Firm*—Carlson, Gaskey & Olds PC

(57) ABSTRACT

An Auxiliary Power System includes an APU controller and an aircraft load controller which include an APU load capacity algorithm which provides an uncomplicated and robust method of APU load control. The APU load capacity algorithm defines three load zones: a continuous APU load capacity zone (zone A); a time controlled zone (zone B); and a fault zone (zone C). Each zone is related to altitude to the service ceiling of the APU to provides consistent APU load capacity that addresses APU performance variation and deterioration effects to an end of the APU useful life.

17 Claims, 3 Drawing Sheets

POWER DISTRIBUTION SYSTEM AND LOAD MANAGEMENT PROTOCOL THEREFOR

BACKGROUND OF THE INVENTION

The present invention relates to a power distribution system, and more particularly to an aircraft power distribution system which employs communication and load control between an aircraft electrical load control system and an Auxiliary Power Unit (APU).

Conventional gas turbine engines provide a variety of power to an aircraft in addition to propulsive thrust. The three main power draws from the engine are electrical, bleed air, and pneumatic/hydraulic. In addition to the engine driven generators that provide electrical power to the aircraft, bleed air is drawn off the engine and used for the aircraft pressurization, cooling and heating systems. The pneumatic/hydraulic systems are pressurized with pumps mechanically driven by an engine driven gearbox. Each of these conventional power distributions systems reduces the engine efficiency and the resulting thrust for aircraft propulsion. Such conventional power distribution systems are effective for current generation aircraft as such aircraft efficiently utilize the extensive bleed air, pneumatic, and mechanical power distribution systems which minimizes electrical power distribution system requirements.

Conventional power distribution systems utilize an Auxiliary Power Unit (APU) type gas turbine engine to provide supplemental electrical power to that provided by generators powered by the propulsion engines. The electrical power provided by a conventional APU type gas turbine engine is typically a small fractional part of the APU total load carrying capacity while the relatively larger fractional part is provided as bleed air, pneumatic mechanical output to the conventional power distribution systems.

Generally, the APU driven generator is the electrical load limiting system component. Further, electrical load is given priority as the APU controller avoids overload conditions by modulating the discretionary non-electric load. The APU controller on this type of combined pneumatic, mechanical, and electrical power APU system is autonomously capable of controlling the load.

Recently, aircraft systems are tending toward usage of electrically powered equipment eliminating the bleed air system. These "more electric" aircraft power distribution systems operate at significantly increased electrical power levels on the order of 1,000 kVA. Conditioning systems such as cabin pressure, cooling and heating are powered by electric motors. The hydraulic pumps are also driven by electric motors. In addition, without a bleed air system to spin-up the engine during start, the generator operates as a motor during the start sequence to spin up the turbine.

With the advent of the "more electrical" aircraft, APU load control is no longer possible solely within the APU system. Some load management shall require action of the aircraft electrical load system. As altitude increases, the APU load carrying capacity inversely decreases as a function of the reduced APU inlet pressure. Therefore as operation occurs at increasing altitudes the available power delivery capability decreases. The load management system for a "more electric" aircraft must shed discretionary electrical loads to protect the APU from operating at excessive gas path temperature conditions while continuing to provide required levels of electrical power associated with a specific altitude.

Accordingly, it is desirable to provide an aircraft power distribution system which efficiently facilitates load management in a "more electric" aircraft power systems.

SUMMARY OF THE INVENTION

A power distribution system according to an aspect of the present invention includes an Auxiliary Power Unit (APU) which generates primarily electric power as required in a "more electric" aircraft which includes minimal if any pneumatic output. An APU controller and an aircraft load controller include an APU load capacity algorithm which provides an uncomplicated and robust method of APU load control. Generally, the APU load capacity algorithm provides consistent APU load capacity that addresses APU performance variation and deterioration effects to an end of the APU useful life; facilitates controlling APU loads in a logical, unobtrusively responding manner that avoids frequent on-off cycling of electrical loads; and facilitates avoidance of excessive APU overloading that promotes achieving enhanced APU durability.

The APU load capacity algorithm defines at least three load zones: a continuous APU load capacity zone (zone A); a time controlled zone (zone B); and a fault zone (zone C). Each zone is related to the service ceiling of the APU. Operation within zone A is unrestricted. Operation within zone B will initiate a load control system timer that limits APU operational time. Operation of the APU within zone B will either end through normal load variation following a transient in which the APU load capacity will be readjusted without intervention to a level below zone B or through the aircraft load control commanding load shedding instructions if the intrusion time exceeds a predetermined time interval. The load control described for zones A and B function regardless of ground or in-flight operations.

In the unlikely event of operation in zone C, the APU Controller will command a shutdown of the APU when occurring during ground operation and will set a fault message to alert the flight crew should this event occur in-flight. In the extremely unlikely event that the operation exceeds the maximum level of the zone C, the APU controller will immediately command a shutdown of the APU when occurring during ground operations and will set a higher level fault message and alert the flight crew should this event occur in-flight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
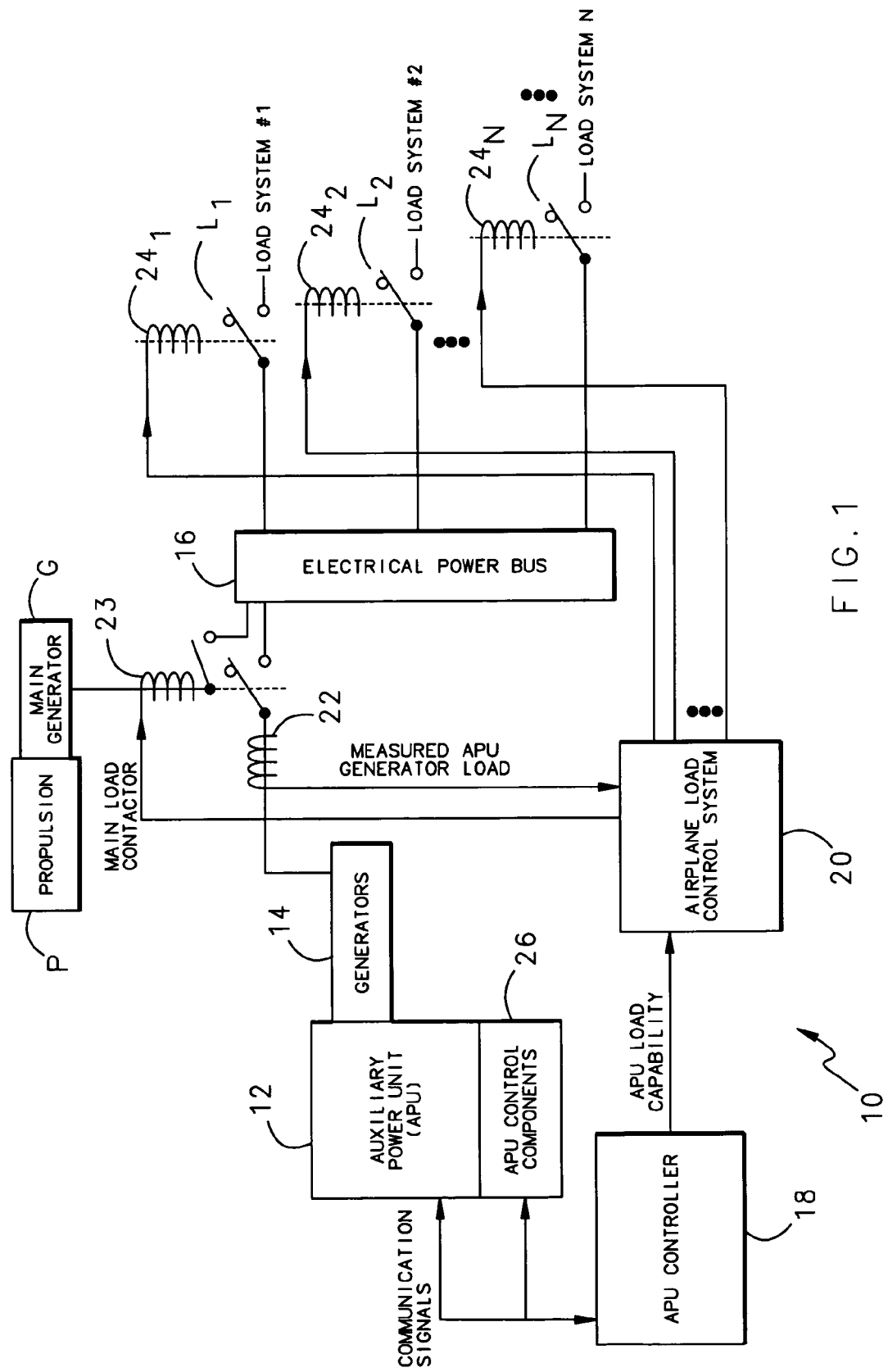
FIG. 1 is a general schematic view of an electric load system for a more electric aircraft.

FIG. 1 illustrates a general schematic block diagram of a power distribution system 10. Power distribution system 10 in one non-limiting embodiment includes a system which operates as an additional power source for a "more electric" aircraft. It should be understood, however, that the Power distribution system 10 may be utilized in other applications, such as in a stationary generating station or ground power unit used to service aircrafts.

The power distribution system 10 generally includes an Auxiliary Power Unit (APU) 12 which drives a generator 14 to power a multitude of loads $L_1$-$L_n$ through a power bus 16. The APU 12 is controlled through an APU controller 18 which communicates with an aircraft load controller 20.

The APU 12 is a gas turbine engine separate from a primary propulsion engine P such as an aircraft turbofan engine. Electrical loads $L_1$-$L_n$ are normally powered within the power distribution system 10 including primary generator G, which in turn is typically driven by the primary propulsion engine P, or possibly a ground power unit used to service the aircraft. The primary generator G provides primary electrical power to the power bus 16 during normal operation of the power distribution system 10 through a load contactor 23 in communication with the aircraft load controller 20.

The APU 12 operates as an additional or alternative electric power source to the power bus 16. The APU 12 forms a system of the aircraft and, as required in a "more electric" aircraft, primarily provides electric power but minimal if any pneumatic output. It should be understood that other motive forces may also be utilized with the present invention.

The electrical output of generator 14 is electrically connected to the power bus 16 though a main load contactor 22. The loads $L_1$-$L_n$ may represent the main electrical and avionic systems of an aircraft. Each of the loads $L_1$-$L_n$ likewise includes a separate load contactor $24_1$-$24_n$. The main load contactor 22 and the separate load contactors $24_1$-$24_n$ are in communication with the aircraft load controller 20 such that the aircraft load controller 20 as well as the APU controller 18 may selectively connect or disconnect (shed) each particular load $L_1$-$L_n$ from the power bus 16 in accordance with a predetermined schedule based on various contingencies.

The APU controller 18 communicates with APU control components 26 to govern the APU 12. APU controller 18 may, for example be a digital electronic gas turbine control, as is customarily used in aviation applications, and thus may control the amount of throttle provided to APU 12, in response to electrical control signals.

The APU controller 18 and the aircraft load controller 20 each utilizes inputs such as electrical control signals provided by the APU control components 26 and the load contactors as well as other additional inputs. The APU controller 18 also provides outputs to the APU control components 26 to operate the APU 12. The APU controller 18 provides APU Load capability data to the aircraft load control system 20 though discrete hardwire signals or data bus protocols.

Figure 2:
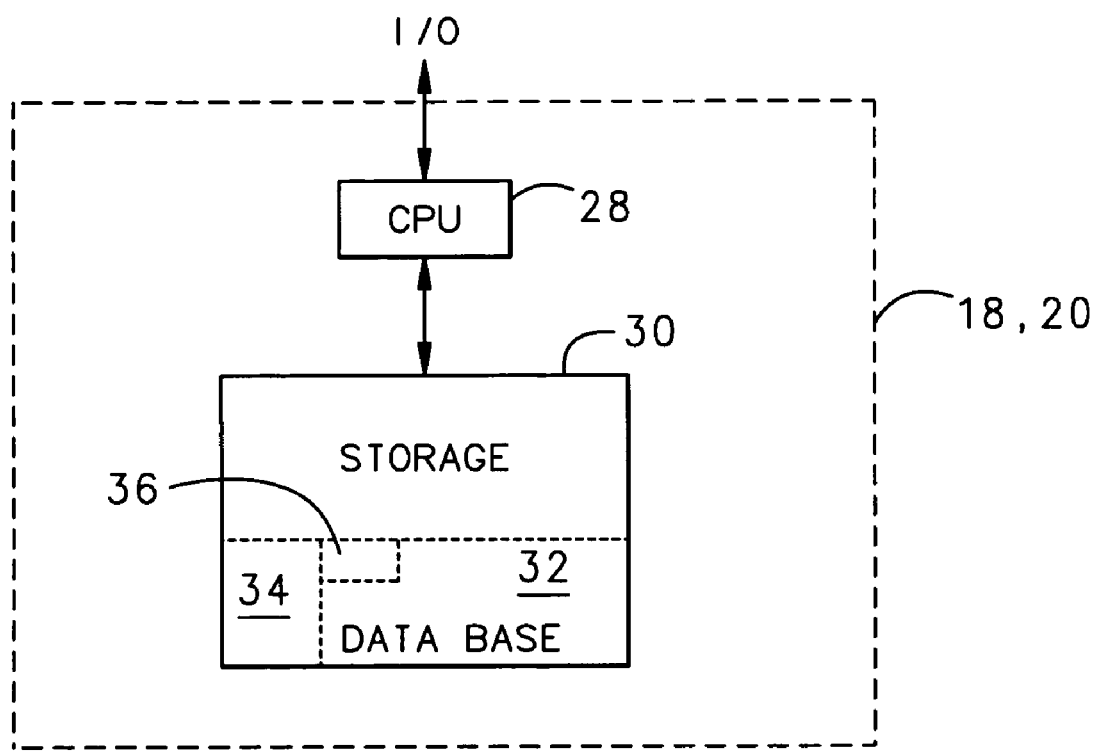
FIG. 2 is an expanded schematic block diagram of an APU controller and the aircraft load controller.

The APU controller 18 and the aircraft load controller 20 are each in one non-limiting embodiment, programmable logic controllers and each includes one or more computers, microprocessors or central processing units (illustrated schematically as CPU 28) and a storage device (illustrated schematically at 30) connected to the CPU 28 (schematically illustrated in FIG. 2). The storage device 30 may include a hard drive, CD ROM, DVD, RAM, ROM, optically readable storage, magnetic storage, integrated circuit, or other readable electronic storage. The storage device 30 contains a database 32 including an APU load capacity algorithm 34, which may be stored as a look-up table or graph that follows a predefined capability chart for the APU 12. Software for the CPU 28, including operation of the APU load capacity algorithm 34, program instructions to function in accordance with the present invention, etc., are additionally or alternatively stored in the storage device 30 or other memory systems. Either the APU controller 18, the aircraft load controller 20 or both include the APU load capacity algorithm 34 programmed therein as exemplarily illustrated in FIG. 3.

Figure 3:
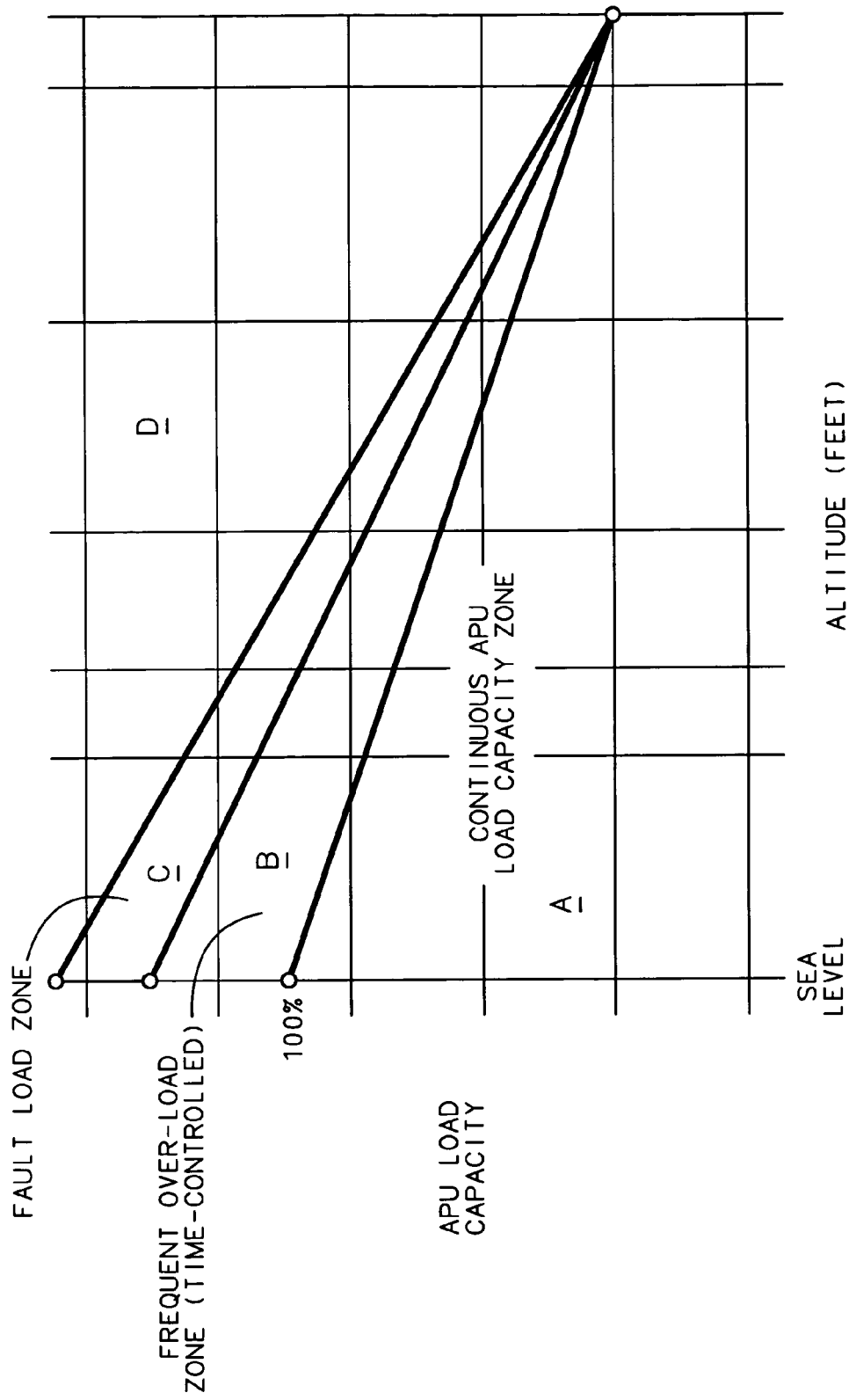
FIG. 3 is an APU load capacity algorithm according to the present invention depicted as a graph.

Referring to FIG. 3, the APU load capacity algorithm 34 is depicted as a graph in the illustrated embodiment. The APU load capacity algorithm 34 provides an uncomplicated and robust method of APU load control. Generally, the APU load capacity algorithm 34 provides consistent APU load capacity that addresses APU performance variation and deterioration effects to the end of APU useful life; facilitates controlling APU loads in a logical, unobtrusively responding manner that avoids frequent on-off cycling of electrical loads; and facilitates avoidance of excessive APU overloading that promotes achieving enhanced APU durability.

The APU load capacity algorithm 34 defines at least three load zones: a continuous APU load capacity zone (zone A); a time controlled zone (zone B); and a fault zone (zone C). Each zone is related to the service ceiling of the APU 12. Notably, the zones converge at this predetermined altitude.

Operation within zone A can be unrestricted. That is, zone A is the normal operating zone of the APU 12 in which the total applied load L1-Ln (FIG. 1) are readily and effectively continuously managed.

Operation within zone B can initiate a load control system timer 36 (FIG. 2) that will limit APU 12 operational time. As schematically illustrated, the load control system timer 36 may be implemented via instruction sets stored in the memory system 30 and run on the programmable processor 28, however, other software and/or hardware control schemes may also be utilized. Operation of the APU 12 within zone B will either end through normal load variation following a transient in which the APU load capacity will be readjusted without intervention to a level below zone B or through the aircraft load controller 20 commanding load shedding instructions if the intrusion time exceeds the predetermined time interval. The load control described for zones A and B function regardless of ground or in flight operations.

In the unlikely event of operation in the Fault Load Zone (zone C), the APU Controller 18 can command a shutdown of the APU 12 when occurring during ground operations and will set a fault message to alert the flight crew should this event occur in-flight. In one non-limiting embodiment, an elapsed time interval for operation Zone C is particularly designated and recorded. The elapsed time interval must expire as a condition before commanding the described accommodation to account for transitory load behavior.

In the extremely unlikely event that the operation exceeds the maximum level of the zone C and progresses into zone D, the APU Controller 18 can immediately command a shutdown of the APU for this condition when occurring during ground operations and will set a higher level fault message and alert the flight crew should this event occur in-flight.

The demarcation lines that delineate the load control zones may be related to temperature values of either a measured or a calculated gas turbine cycle temperature. Most the exhaust gas temperature EGT of the APU 12 is utilized to determine within which zone the APU 12 is operating. Some or all demarcation lines may also be directly related to the measured applied electrical load. The measurement of applied APU loads is accomplished by a total load measurement or measurement of individual circuits summed within the aircraft electrical load control system 20 (FIG. 1). The APU design may also define the maximum continuous load rating based on additional specified requirements.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A power distribution system for an aircraft comprising:
a gas turbine engine;
a controller in communication with said gas turbine engine; and
an aircraft load controller in communication with said gas turbine engine controller and a multitude of loads, one of said gas turbine engine controller and said aircraft load controller including an instruction set with a power source load capacity algorithm operable to selectively shed one or more of said loads, said power source load capacity algorithm defines a multitude of zones, said multitude of zones including a continuous load capacity zone; a time controlled zone above said continuous load capacity zone; and a fault zone above said time controlled zone, said continuous load capacity zone, said time controlled zone and said fault zone related to altitude.

2. The power distribution system of claim 1, wherein said gas turbine engine is an auxiliary power unit (APU).

3. The power distribution system as recited in claim 2, wherein said APU generates only an electrical output.

4. The power distribution system as recited in claim 1, wherein said continuous load capacity zone provides 100 percent of power source load capacity at sea level.

5. A method of controlling a power distribution system having a gas turbine engine comprising:
(1) determining whether the gas turbine engine is operating within a predefined continuous load capacity zone;
(2) determining whether the gas turbine engine is operating within a predefined frequent over-load zone above the predefined continuous load capacity zone for a predetermined time period;
(3) relating the predefined continuous load capacity zone and the predefined frequent over-load zone relative to altitude; and
(4) recording a duration of gas turbine engine operation which exceeds the predetermined time period of said step (2).

6. The method of claim 5, wherein the gas turbine engine is an auxiliary power unit (APU).

7. A method as recited in claim 5, wherein said step (3) further comprises:
(a) generating a fault condition when the time of gas turbine engine operation exceeds the predetermined time period.

8. A method as recited in claim 5, further comprising the steps of:
(4) determining whether the gas turbine engine is operating within a predefined fault load zone above the predefined frequent over-load zone; and
(5) recording a time of gas turbine engine operation within the predefined fault load zone of said step (4).

9. A method as recited in claim 5, further comprising the steps of:
(4) determining that the gas turbine engine is operating within a predefined fault load zone above the predefined frequent over-load zone;
(5) determining that the aircraft is on the ground; and
(6) shutting down the gas turbine engine in response to said step (5).

10. A method as recited in claim 9, further comprising the step of:
(7) setting a fault condition.

11. A method as recited in claim 9, further comprising the steps of:
(7) determining that the gas turbine engine is operating within a zone above the predefined fault load zone;
(8) determining that the aircraft is on the ground; and
(9) shutting down the gas turbine engine in response to said step (7).

12. A method as recited in claim 5, further comprising the steps of:
(4) determining that the gas turbine engine is operating within a predefined fault load zone above the predefined frequent over-load zone;
(5) determining that the aircraft is in the air; and
(6) recording a time of gas turbine engine operation within the predefined fault load zone of said step (4).

13. A method as recited in claim 12, further comprising the step of:
(7) setting a fault condition.

14. A method as recited in claim 12, further comprising the steps of:
(7) determining that the gas turbine engine is operating within a zone above the predefined fault load zone;
(8) determining that the aircraft is in the air; and
(9) recording a time of gas turbine engine operation within the zone of said step (7).

15. A method of controlling a power distribution system having a gas turbine engine comprising:
(1) determining that the gas turbine engine is operating within a predefined continuous load capacity zone;
(2) determining that the gas turbine engine is operating within a predefined frequent over-load zone above the predefined continuous load capacity zone; and
(3) shedding a load in response to said step (2) such that the gas turbine engine operates in the predefined continuous load capacity zone, the predefined continuous load capacity zone and the predefined frequent over-load zone related to altitude.

16. The method of claim 15, wherein said gas turbine engine is an auxiliary power unit (APU).

17. A method as recited in claim 15, further comprising the steps of:
(4) communicating with an aircraft load control system such that said aircraft load control system performs said step (2).

* * * * *

UNITED STATES PATENT AND TRADEMARK OFFICE
CERTIFICATE OF CORRECTION

PATENT NO.      : 7,622,821 B2  
APPLICATION NO. : 11/136746  
DATED           : November 24, 2009  
INVENTOR(S)     : Mehrer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this

Fourteenth Day of December, 2010

David J. Kappos
*Director of the United States Patent and Trademark Office*